J. F. DUFFY.
Implement for Stretching Fence-Wire.

No. 164,910. Patented June 29, 1875.

Witnesses:
N. C. Gridley
F. F. Warner

Inventor:
James F. Duffy

UNITED STATES PATENT OFFICE.

JAMES F. DUFFY, OF CHICAGO, ILLINOIS, ASSIGNOR OF ONE-HALF HIS RIGHT TO NICHOLAS SCHROEDER, OF SAME PLACE.

IMPROVEMENT IN IMPLEMENTS FOR STRETCHING FENCE-WIRES.

Specification forming part of Letters Patent No. 164,910, dated June 29, 1875; application filed May 27, 1875.

*To all whom it may concern:*

Be it known that I, JAMES F. DUFFY, of Chicago, in the county of Cook and State of Illinois, have invented certain new and useful Improvements in Stretchers for Wire-Fences, of which improvements the following is a full, clear, and exact description, which will enable others skilled in the art to which my invention appertains to make and use the said improvements, reference being had to the accompanying drawing forming a part hereof, and in which—

Figure 1:
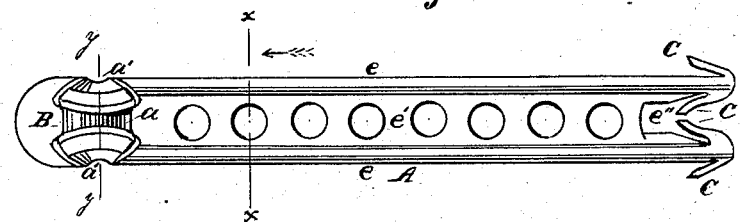
Figure 2:
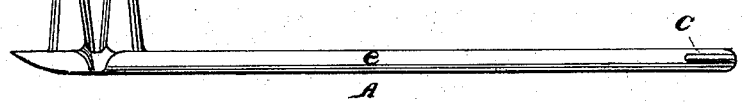
Figure 3:
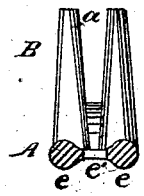
Figure 4:
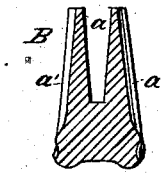

Figure 1 is a top or plan view of my improved stretcher; Fig. 2, a side elevation thereof; Fig. 3, a section in the plane of the line $x\ x$, and Fig. 4 a section in the plane of the line $y\ y$.

Like letters of reference indicate like parts.

My invention relates to that class of stretchers or tighteners employed to take up the slack of the wires of wire-fences, and consists of a lever provided with a forked or bisected reel. My object is to make this class of devices light, cheap, and strong, and to render them capable of being used with greater facility and advantage than heretofore; and to that end my invention consists of the novel manner in which the claw is constructed, and in the manner of securing lightness without a loss of strength, substantially as hereinafter specified.

In the drawing, A represents the lever or handle, and B the reel. The reel is forked or bisected, as shown at $a$, to receive the wires of the fence, and made concave or shallow, as shown at $a'\ a'$, to secure lightness. The web or handle consists of the two long, slender, and parallel bars $e\ e$, united and braced or strengthened by means of the thin and perforated web $e'$, terminating a little before reaching the end of the bars $e\ e$, as shown at $e''$. C C are prongs on the outer ends of the bars $e\ e$. It will be observed, from reference to the drawings, that each bar $e$ is provided with two fingers or prongs projecting laterally from it, and extending in the direction of the reel, thus leaving an angular space or recess between each finger and the bar to which it is attached, each space being sufficient, at its widest part, to receive the wire of the fence. All the parts described are cast in one piece. It will be perceived that lightness is secured without sacrificing strength, and that the device may therefore be made cheaply, and yet be sufficiently durable and strong for the purpose for which it is intended.

The stretcher may be used in the usual manner.

It frequently happens that, in tightening the wires of fences, it may be expedient to leave the stretcher in a vertical position—sometimes engaged by the wire above the one being tightened, and sometimes by the one below it—the upper or lower wire being then held by the claw. When the claw engages the same wire engaged by the reel it may be desirable to leave the claw sometimes in one direction from the reel and sometimes in the opposite direction. I have, therefore, made a claw consisting of four prongs arranged, as shown, to admit of this varied arrangement or position of the handle, and so that the claw may be made to seize the various wires with facility.

Having thus described my invention, what I claim as new, and desire to secure by Letters Patent, is—

The lever or handle A, consisting of the bars $e\ e$, united by means of the perforated web $e'$, and provided at one end with a forked reel, and at the other with the prongs C C, arranged as shown, substantially as specified, and for the purposes set forth.

JAMES F. DUFFY.

Witnesses:
F. A. HERRING,
N. C. GRIDLEY.